(12) United States Patent
Jäger et al.

(10) Patent No.: US 11,192,722 B2
(45) Date of Patent: Dec. 7, 2021

(54) BELT AS ENDLESS TRACTION MEANS AND METHOD FOR PRODUCING SUCH A BELT

(71) Applicant: Arnold Jäger Holding GmbH, HanNover (DE)

(72) Inventors: Sebastian Jäger, Hannover (DE); Nick Schmidt, Lehrte/Immensen (DE)

(73) Assignee: ARNOLD JÄGER HOLDING GMBH, Hannover (DE)

( * ) Notice: Subject to any disclaimer, the term of this patent is extended or adjusted under 35 U.S.C. 154(b) by 0 days.

(21) Appl. No.: 16/711,709

(22) Filed: Dec. 12, 2019

(65) Prior Publication Data

US 2020/0189849 A1 Jun. 18, 2020

(30) Foreign Application Priority Data

Dec. 14, 2018 (EP) ..................................... 18212569

(51) Int. Cl.
*B65G 15/30* (2006.01)
*B65G 15/34* (2006.01)
(Continued)

(52) U.S. Cl.
CPC ............. *B65G 15/34* (2013.01); *A01D 61/02* (2013.01); *A01F 17/02* (2013.01); *B32B 5/02* (2013.01);
(Continued)

(58) Field of Classification Search
CPC ........ B65G 15/30; B65G 15/34; B65G 15/36; F16G 3/10; B29C 66/4324; B32B 5/02;
(Continued)

(56) References Cited

U.S. PATENT DOCUMENTS 1,635,185 A 7/1927 Kimmich
3,217,555 A \* 11/1965 Brooksbank ........... B65G 15/34
474/254
(Continued)

FOREIGN PATENT DOCUMENTS

CN 104044290 A 9/2014
CN 104327759 A 2/2015
(Continued)

OTHER PUBLICATIONS

Chinese Office Action dated Aug. 3, 2021 in Application No. 201911324192.2; 18 pgs.

*Primary Examiner* — Joseph A Dillon, Jr.
(74) *Attorney, Agent, or Firm* — Vedder Price P.C.

(57) ABSTRACT

The invention relates to a belt (1) as a continuous traction means, in particular for conveyor belts of agricultural machines, in particular baling presses, comprising at least one fabric layer (2) embedded, at least in certain regions, in a polymer layer (3), in particular rubber layer, whereby end regions (1a, 1b) of the belt (1) lie flat on top of one another in an overlap region (4) and are connected to each other for creating a continuous belt (1) reinforced by the fabric layer (2).

Figure 2C:
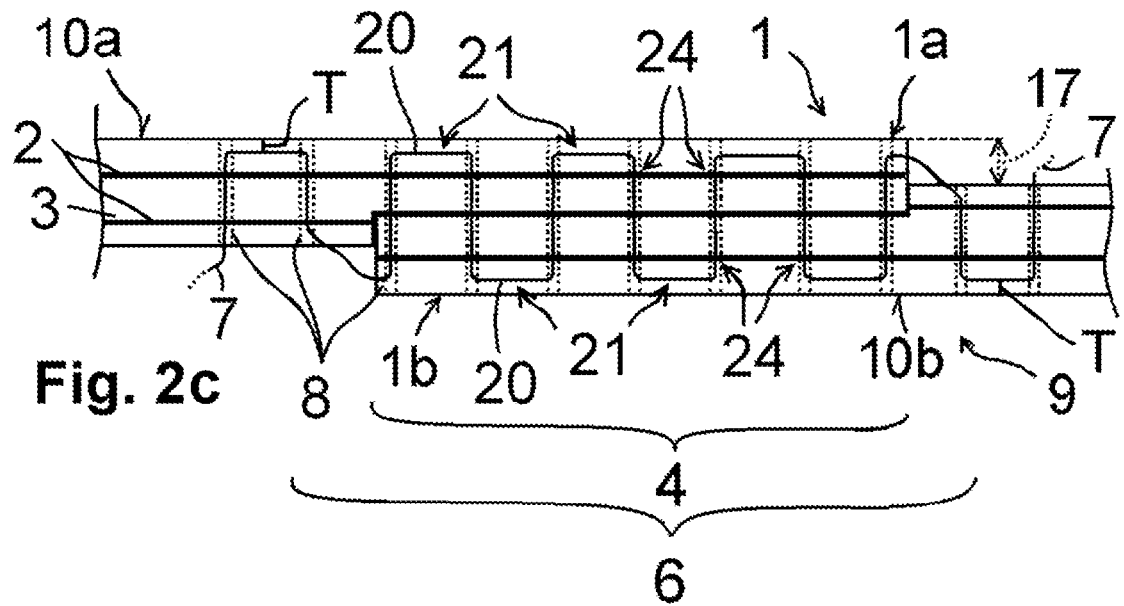

According to the invention, it is provided that the end regions (1a, 1b) of the belt (1) are connected to each other by at least one thread (7) forming a seam (9), whereby, to that end, said at least one thread (7) penetrates the end regions (1a, 1b) of the belt (1) in a seam region (6) in several stitches (8), whereby the fabric layer (2) of the belt (1) is embedded in the polymer layer (3) at least across said seam region (6), and the thread (7) is embedded in transition regions (20) between the stitches (8) into the polymer layer (Continued)

(3) in such a manner shallowly at a depth of penetration (T) that the thread (7) runs below surfaces (10a, 10b) of the belt (1).

10 Claims, 3 Drawing Sheets

(51) Int. Cl.
  *B32B 7/09*     (2019.01)
  *A01D 61/02*    (2006.01)
  *A01F 17/02*    (2006.01)
  *B32B 5/02*     (2006.01)
  *B32B 5/24*     (2006.01)
  *B32B 25/04*    (2006.01)
  *B32B 25/10*    (2006.01)
  *B32B 38/00*    (2006.01)

(52) U.S. Cl.
  CPC .............. *B32B 5/24* (2013.01); *B32B 7/09* (2019.01); *B32B 25/04* (2013.01); *B32B 25/10* (2013.01); *B32B 38/00* (2013.01); *B32B 2038/008* (2013.01); *B32B 2250/02* (2013.01); *B32B 2260/021* (2013.01); *B32B 2410/00* (2013.01); *B32B 2433/02* (2013.01)

(58) Field of Classification Search
  CPC ........... B32B 7/09; B32B 25/10; B32B 27/12; B32B 2413/00; B32B 2433/02; B32B 2038/008
  USPC ..................................... 198/844.2, 846, 847
  See application file for complete search history.

(56) References Cited

U.S. PATENT DOCUMENTS

| | | | | |
|---|---|---|---|---|
| 3,998,986 A * | 12/1976 | Williams | ................ | B32B 5/06 428/102 |
| 4,034,617 A * | 7/1977 | Guyer | ................ | B29C 66/723 198/847 |
| 4,184,589 A * | 1/1980 | Habegger | ............ | B29D 29/06 198/847 |
| 4,235,120 A * | 11/1980 | Candle | ................ | B29C 65/4835 474/254 |
| 4,427,107 A * | 1/1984 | Roberts | ................ | F16G 3/10 198/844.2 |
| 4,596,540 A * | 6/1986 | F'Geppert | ................ | F16G 3/10 24/306 |
| 4,721,497 A * | 1/1988 | Jager | ................ | B62D 55/213 24/37 |
| 4,892,509 A * | 1/1990 | Jager | ................ | A01D 17/10 474/237 |
| 4,929,397 A * | 5/1990 | Jager | ................ | B01F 3/04269 261/65 |
| 4,953,920 A * | 9/1990 | Jager | ................ | B62D 55/205 305/165 |
| 5,020,658 A * | 6/1991 | Jager | ................ | A01D 17/10 198/844.2 |
| 5,088,177 A * | 2/1992 | Jager | ................ | A01D 17/10 198/850 |
| 5,205,105 A * | 4/1993 | Krone | ................ | A01D 90/04 53/118 |
| 5,240,531 A * | 8/1993 | Toda | ................ | B29C 66/1162 156/137 |
| 5,326,411 A * | 7/1994 | Arnold | ................ | A01F 15/07 156/137 |
| 5,531,316 A * | 7/1996 | Savino | ................ | B29C 65/5057 198/844.2 |
| 5,670,230 A * | 9/1997 | Schlueter, Jr. | ............ | F16G 3/10 198/844.2 |
| 6,234,305 B1 * | 5/2001 | Brown | ................ | F16G 3/10 198/844.2 |
| 6,237,754 B1 * | 5/2001 | Tjabringa | ............. | B65G 15/52 198/803.14 |
| 6,827,803 B1 * | 12/2004 | Willis | ................ | B29C 65/7847 156/157 |
| 7,267,219 B2 * | 9/2007 | Vogt | ................ | B65G 15/34 198/844.1 |
| 7,703,600 B1 * | 4/2010 | Price | ................ | F16G 3/02 198/847 |
| 7,980,979 B2 * | 7/2011 | Jakob | ................ | F16G 3/08 474/253 |
| 8,640,862 B2 * | 2/2014 | Perrin | ................ | F16G 3/10 198/847 |
| 8,720,675 B2 * | 5/2014 | Gentz | ................ | F16G 3/10 198/847 |
| 10,850,924 B1 * | 12/2020 | Jager | ................ | B65G 17/063 |
| 2002/0014299 A1 * | 2/2002 | Dolan | ................ | B32B 7/08 156/92 |
| 2003/0201057 A1 * | 10/2003 | Dolan | ................ | F16G 3/10 156/98 |
| 2005/0252388 A1 * | 11/2005 | Krone | ................ | A01F 15/0833 100/88 |
| 2006/0278499 A1 * | 12/2006 | Grywacheski | ......... | B65G 15/30 198/844.2 |
| 2008/0153647 A1 | 6/2008 | Muma et al. | | |
| 2009/0098385 A1 * | 4/2009 | Kaemper | ............ | B29C 66/723 428/422.8 |
| 2011/0198016 A1 * | 8/2011 | Kasuya | ................ | B32B 5/026 156/93 |
| 2011/0272845 A1 * | 11/2011 | Frey | ................ | B29C 66/004 264/152 |
| 2012/0058326 A1 * | 3/2012 | Tippett | ................ | B65G 15/38 428/220 |
| 2013/0228422 A1 * | 9/2013 | Mathieu | ................ | B65G 15/34 198/846 |
| 2013/0256101 A1 * | 10/2013 | Gentz | ................ | B65G 15/34 198/847 |
| 2014/0183010 A1 * | 7/2014 | Muehlen | ................ | B31F 1/2877 198/844.2 |
| 2014/0367230 A1 * | 12/2014 | Jager | ................ | B65G 17/063 198/850 |
| 2017/0023101 A1 * | 1/2017 | Jager | ................ | F16G 3/08 |
| 2018/0223951 A1 * | 8/2018 | Schroeder | ................ | F16G 3/08 |
| 2018/0347207 A1 * | 12/2018 | Hayes | ................ | E04F 15/225 |
| 2019/0085939 A1 * | 3/2019 | Matsukawa | ............ | F16H 7/023 |
| 2020/0079054 A1 * | 3/2020 | Fujiwara | ................ | B32B 5/22 |
| 2020/0173523 A1 * | 6/2020 | Hamamoto | .............. | B32B 5/10 |
| 2020/0180232 A1 * | 6/2020 | Jakob | ................ | B29C 66/8362 |
| 2021/0071365 A1 * | 3/2021 | Sealey, II | ................ | B32B 3/06 |

FOREIGN PATENT DOCUMENTS

| | | |
|---|---|---|
| CN | 107924020 A | 4/2018 |
| CN | 207908403 U | 9/2018 |
| DE | 3808711 A1 | 9/1989 |
| DE | 10037645 A1 | 2/2002 |
| DE | 102004023705 B3 | 6/2005 |
| DE | 102011116633 A1 | 4/2013 |
| EP | 1134451 A2 | 9/2001 |
| EP | 3078880 A1 | 12/2016 |
| FR | 2268995 A1 | 12/1975 |
| JP | 2002372106 A | 12/2002 |
| WO | 2008082944 A2 | 7/2008 |

\* cited by examiner

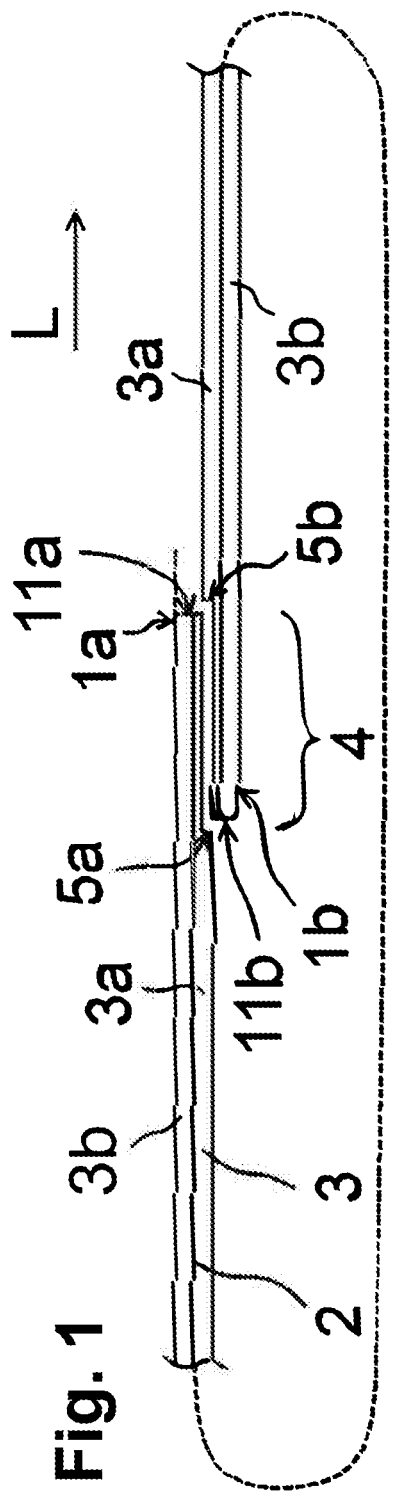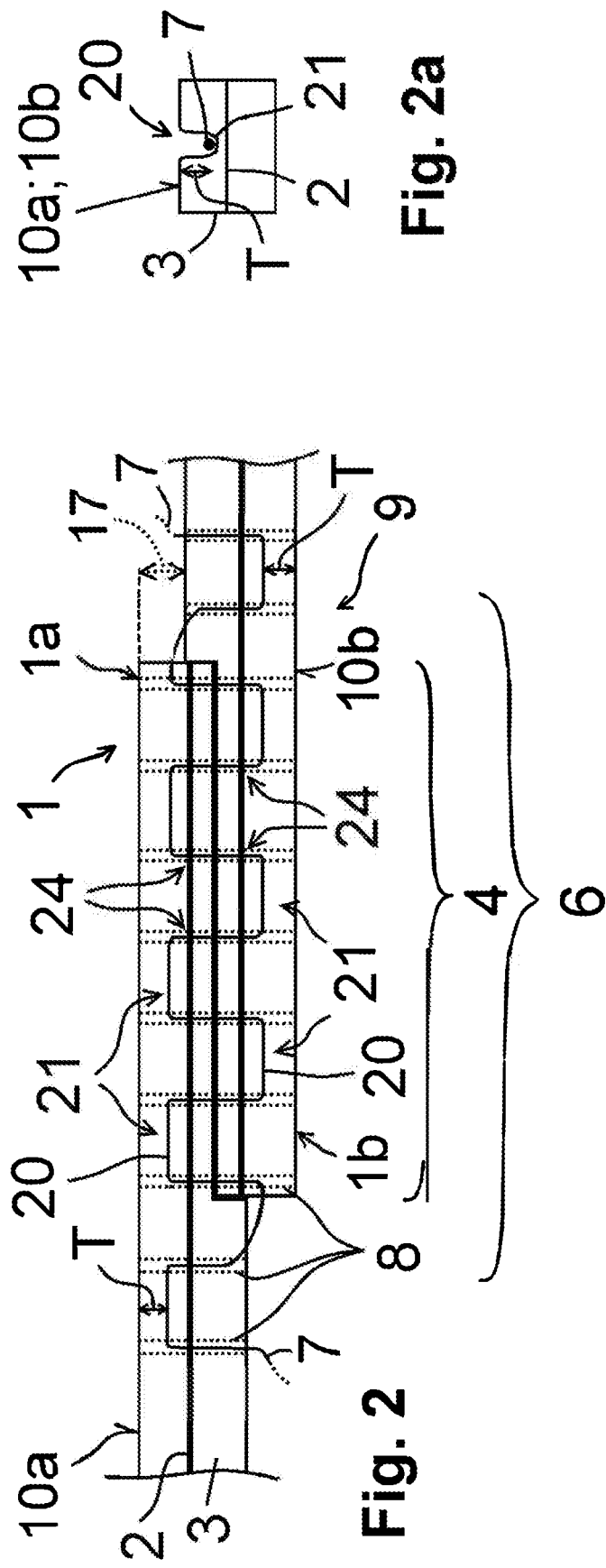

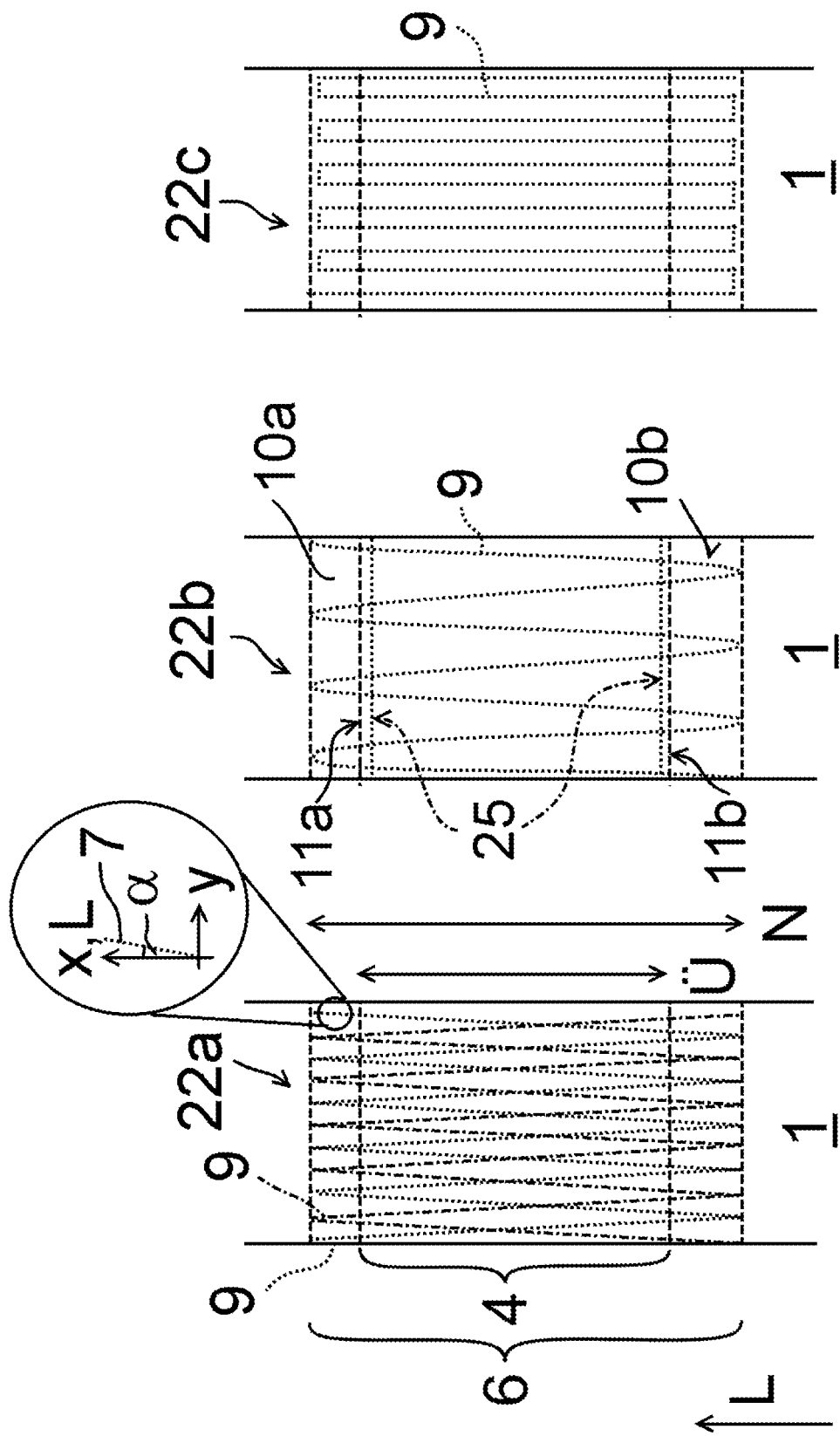

BELT AS ENDLESS TRACTION MEANS AND METHOD FOR PRODUCING SUCH A BELT

The present invention relates to a belt as a continuous traction means, in particular for conveyor belts of agricultural machines, in particular baling presses, as disclosed herein. The invention further relates to a method for manufacturing such a belt.

A belt of this type has been disclosed in the document DE 10 2004 023 705 B3 relating to a machine for picking up and pressing agricultural crop, e.g. hay or straw. This machine is provided with a bale conveyor comprising two spaced-apart belts interconnected via transverse rods spaced apart from each other in parallel. The belts are made of a plastics material or of rubber and are reinforced by at least one layer of fabric.

The citation US 2008/0153647 A1 describes a continuous belt mad from an elastomer material. It is utilized, likewise, in baling presses and is reinforced by a winding element made of steel cord extending in the longitudinal direction of the belt and being embedded in a rubber matrix. In addition to this winding element a further steel cord reinforcement is provided which is oriented perpendicular to the longitudinal direction of the belt. In der baling press these belts are arranged in a multiplicity next to each other and act directly on the crop to be shaped into bales.

In order to be usable, the belts must be in an endless shape. For creating such a continuous shape several methods are known in the state of the art.

Thus, it is known from the document DE 100 37 645 A1 to interlock the two ends of the belt in a comb-shaped manner and, in order to make the belt endless, to slide the interlocking regions into one another and to vulcanize them. The citation DE 3 808 711 A1 provides for metal fittings affixed to both belt ends that are designed essentially u-shaped and are alternatingly arranged on the belt ends. The legs of the fittings embrace the belt end between themselves with compression and are fastened by rivets extending through the belt ends. The essentially semicircular bars of the fittings connecting the legs are in alternating contact with a rod that extends across the entire width of the belt ends and is inserted upon assembly of the belt and must be pulled out for disassembly of the belt. The rod consists of a suitable material, however, it may also be designed as a strong wire rope. This design bears the disadvantage that the fittings wear over time in the region of the semicircular bars by friction with the rod making it necessary to replace the belt.

In the citation EP 3 078 880 A1 a tension means designed as a cam belt is made continuous by means of a belt lock. Belt locks of this type are frequently used in various embodiments for making tension means endless tension means for conveyor belts of agricultural machines.

Further, in the document DE 10 2011 116 633 A1, a flat belt as tension means is known made from fabric layer reinforced polymer. This belt is made continuous in that it is graded multiple times at both ends across the entire width. This creates an area of overlap in which a first end region of the belt and a first end region of the belt lie on top of one another in an overlapping manner. At its underside the belt is provided with grooves arranged evenly spaced and extending perpendicular to the longitudinal direction, which serve to receive anchor plates in the overlap regions. Each anchor plate comprises two welded-on and spaced apart screw bolts. When the belt ends are placed on top of one another, these screw bolts penetrate holes provided in the belt ends and aligned with each other. Nuts are screwed onto the ends of the screw bolts protruding from the belts and tightened firmly, thereby pressing the belt ends firmly together to allow tensile forces to be transmitted.

A disadvantage of such belt connections is that their creation is complex and they can generate disturbing noise in operation in that metal components in the area of the belt joint impact other components, e.g. toothed wheels or roller or similar.

Therefore, it is the object of the present invention to provide a belt of the afore-mentioned type which has a high degree of tensile strength, is easy to manufacture, and can guarantee a minimum of noise creation in operation. A further object is to define a method for manufacturing such a belt.

This task is solved according to the invention by a belt exhibiting the features of claim 1 as well as a manufacturing method according to the further independent claim. Preferred further developments are specified in the sub-claims.

Thus, a belt according to the invention as an endless traction means is brought into an endless shape in that the end regions, having placed on top of one another in an overlap region, are connected to each other by at least one thread forming a seam, whereby, to that end, the at least one thread penetrates the end regions of the belt in a seam region in a multiplicity of stitches, whereby the at least one fabric layer of the belt is embedded, at least across this seam region, in the polymer layer, and the thread is embedded, at transition regions between the stitches, in the polymer layer close to the surface at a depth of penetration in such a way that the thread runs essentially completely or at least partially or at least mostly below surfaces of the belt or, respectively, does not or not significantly protrude from the belt beyond this.

For a long time it has been state of the art to interconnect belts, preferably made of crosslinked polymer, in particular rubber, with embedded fabric layers, in the end regions in order to attain a continuous belt. Due to the high load of the belt in operation, e.g. at a conveyor belt for agricultural machines, it has never been realized to create such a joint by means of an additional thread or a seam respectively. This is because in such a seam application the in-woven thread usually protrudes beyond the surface of the belt out of the polymer upper material so that the thread is significantly compromised by the large forces involved, in particular in the overlap region or seam area respectively, leading to the belt connection coming apart again after a short period of time.

Due to the design of the seam according to the invention, this problem no longer appears or appears only after a much longer period of time because the thread interconnecting the end regions is preferably embedded totally or at least mostly in the polymer upper material of the belt, e.g. in the rubber layer. Thus, the belt rests, on e.g. pulleys or drive rollers or in the case of a baling press on the collected crop, only with its surface so that any interaction between these elements and the thread can be avoided advantageously because the thread is protected by the polymer upper material into which it is embedded. Therefore, forced acting on the surface of the belt are transmitted to the thread, if at all, only marginally so that the thread itself is not compromised or compromised only after a long period of time in its function of keeping the end regions of the belt together and carrying tensile forces. This markedly increases the durability of such a belt.

Hereby, in particular, such an endless belt can be utilized in conveyor belts of agricultural machines, in particular in baling presses. Other applications involving continuous tension means operated under tensile loads are also possible, however.

Hereby, preferably, it is provided for the belt to have a surface structure at least in certain regions, in particular, in the seam region and/or in the overlap region, thereby exhibiting a certain roughness or unevenness into which the thread can penetrate in the overlap region. It is also possible to provide for a further reaching surface structure. This will allow the thread, by virtue of penetrating the structure, to be at least partially embedded into the surface at the transition agrees. A tensioning of the thread or similar measures for superficial embedding can thereby be minimized or even omitted altogether. A tensile stress acting on the thread in operation of the belt will then lean, if anything, only to a very slightly deeper penetration of the thread into the polymer layer so that the thread continues to be sufficiently tensioned and does not become overly loose.

Hereby, preferably, the surface of the belt is formed by the polymer layer or, respectively, the rubber layer as polymer upper material extending cross the entire belt or essentially only across the seam area. Thus, the construction and the type of the polymer layer besides the seam area can be adapted flexibly to the application because the connecting by means of the thread according to the invention requires merely a polymer layer in the seam area in order to embed the thread therein. In addition, it may also be provided for the surfaces of the belt to be covered, at least in the seam area, by a further vulcanized polymer layer. This can help protect the thread, advantageously, additionally against surface load on the belt.

Thus, preferably, the thread is arranged in the transition regions between the stitches in a recess extending at a penetration depth from the surface, whereby the recess can be introduced, at least in certain regions, by subjecting the thread to thread tension, in particular in a sewing process and/or in operation of the belt. This renders additional measures for embedding obsolete and the embedding can be attained solely by the correspondingly controlled sewing process and/or by operating the belt. To that end, the material of the polymer layer should be chose to be not too rigid. Hereby, the thread tension for forming the recess is reduced where a structured surface is already present. Furthermore, it may also be provided for the recess to be formed in the surfaces in advance, e.g. in the form of a groove or and introduced profile respectively, and the thread may be sewn in along this pre-fabricated recess. Alternatively, it may be provided for the thread to be completely covered by the polymer layer in the transition regions between the stitches below the surface of the belt at the depth of penetration. This can be attained, for example, by adding the polymer layer only after sewing.

Preferably, it is further provided for at least a part of the polymer layer or another polymeric cover to be arranged between the fabric layer and the transition regions of the thread. Thus, preferably, the thread is embedded into the polymer layer not so deep so that the thread lies flat on the fabric. This prevents the thread, which is slidable in relation to the fabric, from rubbing off against the fabric when the belt is operated and thereby becoming ruptured.

According to a preferred further development it is provided for a majority of the transition regions, preferably all transition regions, to comprise a direction component between the stitches which is oriented parallel to a longitudinal direction of the belt. Hereby, it can be achieved that a tensile load on the belt can be efficiently diverted by the thread. The thread diverts the tensile load and possible further forces preferably into the fabric layer which is penetrated by the stitches at several intersection points by the thread. This can guarantee a particularly high tensile resistance of the continuously connected belt with high durability of the belt joint.

Hereby, preferably, it is provided that an angle between the longitudinal direction of the belt and a majority of the transition regions, preferably all transition regions, is between 5° and 60°, preferably between 5° and 45°, to enable a particularly efficient deflection of the tensile load because the direction component which runs parallel to the longitudinal direction prevails. Preferably, this can be attained by the seam realized by at least one thread exhibiting a zigzag path and/or a wave-shaped path and/or a rectangular path or combinations thereof.

Further, preferably, an assembly seam or multiple assembly seams can be provided running in the seam area essentially perpendicular to the longitudinal direction of the belt, whereby the main direction component of the respective assembly seam preferably runs at an angle of more than 45° to the longitudinal direction of the belt, preferably about 60° to the longitudinal direction of the belt. This preferably serves to press the belt ends onto the surface of the belt in order to prevent the end regions from folding over starting at the belt ends. This allows for continuous constant running of the belt and for avoiding or postponing respectively any ripping of the belt connection by the end regions folding over.

This can also be attained, in addition or in the alternative, in that the seam area at least on one side or, respectively, in certain areas goes beyond the overlap region so that stitches and transition regions are also located outside the overlap region. Thus, the seam must merely be guided across the overlap region, and this simplifies pressing-on of the belt ends because no further seam is required.

Advantageously, it may further be provided for the fabric layer to exhibit a double fabric structure and/or the fabric layer is designed as a fabric in SZ twist configuration, whereby the fabric layer is penetrated by the thread at intersection points. Thus, the sewn-in thread is associated primarily not with the fabric but is introduced later to connect the end regions to one another. The double fabric structure in and of itself already exhibits a very high tensile strength so that the tensile load diverted through the thread can also be diverted with particular efficiency in the area of the belt connection increasing the overall tensile strength and durability of the continuous belt. Furthermore, in this structure weft threads run in pairs on top of one another so that the thread penetrating the fabric layer is spanned by two weft threads per side, increasing the pull-out strength of the thread. This also improves the tensile strength of the belt across the belt connection. A fabric in SZ twist configuration has been described by way of example in the document EP 0 213 219 A1, the entire contents of which are hereby incorporated by reference into the present application. This alone can guarantee a very high tensile strength of the belt and at the same time a good transfer of the tension loads from the thread into the fabric layer. Moreover, the fabric in SZ twist configuration can also guarantee an improved directional stability of the belt.

Preferably, it is further provided that a substance-to-substance bond is created between the end regions of the belt. This can additionally safeguard the durability of the belt connection. Moreover, in addition to this, this can serve to transmit at least part of the effective tensile load between the end regions so that the connection via the thread can be at least partially relieved. Preferably, this substance-to-substance bond can also be generated in that first a non-cross-linked polymer layer is arranged between the end regions on the inner surfaces which would otherwise be in contact with one another, and this layer is cross-linked or vulcanized respectively prior to or after sewing. In principle, it may also be provided for this non-cross-linked polymer layer between the end regions to be not vulcanized and thereby merely acting as a protective layer between the end regions in the sewn state.

Further, it may be provided that the end regions of the belt are graded in an opposite manner to minimize any overhang between the end regions, whereby, to that end, in the respective end region an inside facing outer covering layer of the polymer layer is ablated at least in part, e.g. by means of pulling off the inside facing outer covering layer of the polymer layer, thereby creating one step each, and the oppositely graded end regions lie flat upon one another in the overlap region to create the continuous belt. This can further improve the running characteristics of the belt as well as its durability. In addition, it may also be provided that the respective outside facing outer cover layer of the polymer layer, at least in the respective end region or seam region, is ablated prior to sewing and, after sewing the end regions, at least in the seam region, a non-cross-linked polymer layer is applied completely covering the seam, and to cross-link or vulcanize this afterwards so that this becomes part of the belt, into which the fabric layer is embedded at least in part and into which, in accordance with the invention, the thread is then also embedded at the depth of penetration. This can further improve the embedding of the thread.

According to the invention, in a method for manufacturing a belt of the type described above, at least the following steps are provided:

providing an open belt having at least one fabric layer embedded, at least in part, into a polymer layer;

laying end regions of the belt flat on top of one another in such a way that the end regions overlap in an overlap region;

connecting the end regions of the belt in order to create a continuous belt, whereby it is provided that the end regions of the belt are connected to each other by at least one thread, whereby, to that end, the at least one thread is pushed in several stitches through the end regions of the belt in a seam region thereby creating a seam, whereby the at least one fabric layer of the belt, at least after the seam has been created, is embedded into the polymer layer at least across this seam region so that the thread, upon or at least after making the connection or the seam respectively, is embedded in transition regions between the stitches into the polymer layer in such a manner shallowly at a depth of penetration that the thread runs essentially entirely below surfaces of the belt. This can, advantageously, guarantee a simple process sequence for making the belt according to the invention.

Preferably, it is further provided that the polymer layer is already cross-linked when the open belt is provided or the polymer layer is cross-linked only after making the connection of the end regions using the thread. Such subsequent cross-linking by means of a suitable heat treatment can additionally improve the embedding of the thread.

Preferably, it is further provided that the belt, prior to placing the end regions flat on top of one another, is graded in the end regions, for example, by means of pulling off the inside facing outer cover layer of the polymer layer. This can improve the running characteristics and the durability.

Preferably, it is further provided that the belt, prior to connecting the end regions using the thread, are provided with a surface structure at least in the seam region. This cans facilitate the embedding of the thread because less thread tension is required for embedding and later in operation the thread is pulled less strongly into the polymer layer by die tensile load thereby essentially retaining its tension.

Preferably, it is further provided that, after the seam has been created, a further polymer layer covering the surfaces of the belt at least in the area of the seam is applied and cross-linked or vulcanized respectively. This can advantageously additionally protect the thread against surface load on the belt. Preferably, to that end, it may be provided that the cover layer lying outside respectively of the polymer layer of the belt provided is ablated prior to sewing at least in the respective end region or in the area of the seam respectively and, after sewing of the end regions, a non-cross-linked polymer layer is applied again as an outside facing outer cover layer at least in the area of the seam, such that the seam is completely covered thereby. This non-cross-linked polymer layer is cross-linked or vulcanized after sewing so that it becomes a component of the belt and, thus, the fabric layer is embedded partially and the thread is also embedded therein. With this method, consequently, the thread is embedded in the polymer layer of the belt only after sewing. This can further improve the embedding of the thread without increasing the thickness of the belt in the area of the seam.

Figure 4:
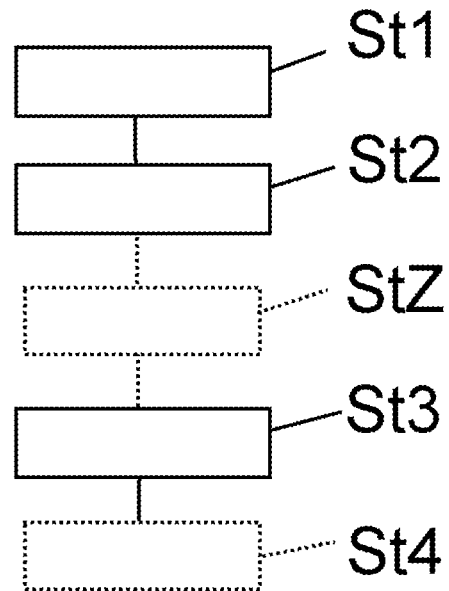

The invention is further illustrated below by means of an embodiment example. The associated drawing shows in:

FIG. 1 a longitudinal section through a belt according to the invention;

FIG. 2, 2a, 2b, 2c detail views of the belt according to FIG. 1;

FIG. 3a, b, c detail views of a seam region of the belt according to FIG. 1; and FIG. 4 a flow chart for carrying out the method.

The belt 1 shown in FIG. 1 can be utilized as traction means for conveyor belts of agricultural machines, in particular, in a bale shaping means of a baling press, where it circulates inside thereof on several pulleys and a drive roller (not shown). However, the belt 1 can also be used in other applications where it may come in other embodiments as shown here, as is apparent from the following description.

To that end, the belt 1 is joined at its end regions 1a, 1b in order to form a continuous belt 1 that may e.g. be mounted onto the rollers of a conveyor device of an agricultural machine. The belt 1 consists, at least in part, of a fabric layer reinforced, cross-linked polymer, thus comprising at least one reinforcing fabric layer 2 which is embedded, at least in certain regions, for example, in a polymer layer 3, in particular rubber layer, so that the fabric layer 2, at least in certain regions, is covered above and below by the polymer layer 3 as polymer cover material. Potentially, other or additional polymer layers and/or polymer coatings may be provided as polymer cover material.

For creating the continuous belt 1 it is provided first to place the end regions 1a, 1b of the belt 1 in an overlap region 4 flat on top of one another. Hereby, according to FIG. 1, the end regions 1a, 1b are oppositely graded, whereby, for that purpose, the inside facing outer cover layer 3a of the polymer layer 3 is at least partially ablated in both end regions 1a, 1b thereby forming one step 5a, 5b each. This measure can reduce an overhang 17 (see FIGS. 2, 2c) in the overlap region 4 thereby improving the running characteristics of the belt 1 as well as its durability. In principle, however, a step-less overlap may be provided in the alternative. In addition, it may be provided to form a wide-area substance-to-substance connection in the area of the steps 5a, 5b between the end regions 1a, 1b via an arbitrary bonding means or a non-vulcanized polymer layer arranged between the end regions 1a, 1b which will be cross-linked after sewing. Alternatively, depending on the application, the additional non-vulcanized polymer layer arranged between the end regions 1a, 1b may remain non-cross-linked.

According to FIG. 2, the end regions 1a, 1b of the belt 1 that have been placed on top of one another are subsequently sewn together in a seam area 6 using at least one thread 7, whereby, to that end, the thread 7 penetrates, in particular, the two end regions 1a, 1b in several stitches 8. This creates one seam 9 per thread 7 having a certain seam shape, whereby FIG. 2 shows an exemplary sectional view along such a seam 9. Additionally, FIG. 2c shows a section through a belt 1 with two embedded fabric layers 2. In order to be able to operate such an endlessly joined belt 1 over a sustained period of time under high tensile load, the thread 7 is introduced into the seam area 6 under the following considerations:

In operation of the belt 1, in order to prevent the thread 7 to suffer wear and eventually tear as a consequence owing to continues load, e.g. by pressure and/or friction with the conveyed crop as well as the deflector pulleys or the drive roller or other components in contact (depending on the application), the thread 7 is embedded in transition regions 20 between the individual stitches 8 into the polymer layer 3 of the respective end region 1a, 1b, as shown schematically in FIG. 2, 2c.

Hereby, embedded shall mean that the thread 7 preferably lies completely below the surfaces 10a, 10b of the polymer layer 3 or does not project from the belt 1 beyond them respectively even in the transition regions 20 between the stitches 8. Thus, the thread 7 penetrates the belt 1 or, respectively, its surface 10a, 10b at a certain depth of penetration T. This can guarantee that the belt 1 contacts the rollers or, respectively, the crop or, respectively, the respective application specific component mainly at its surfaces 10a, 10b and the embedded thread 7, depending on the depth of penetration T into the polymer layer 3, bears no or at least less load thereby being protected.

If the belt 1 comprises, besides the polymer layer 3 further polymer layers and/or polymer coatings on the surface, then the thread 7 is correspondingly embedded into these, i.e. extends correspondingly at a depth of penetration T below the surfaces of such further layers or, respectively, or does not project from the belt 1 beyond them respectively.

The embedding of the thread 7 into the surfaces 10a, 10b of the belt 1 is facilitated by the polymer layer 3 formed on the surface at least in the seam area 6, whereby the polymer layer 3 should not be too hard so as to allow the thread 7 to dip into it. At the same time, the polymer layer 3 must not be too soft, so that forces acting on the belt 1 are not or only slightly transmitted to the thread 7 and the polymer layer 3 does not wear too quickly in operation thereby exposing the thread 7. For the same reason, the thickness of the polymer layer 3 in the seam area 6 should be at least 1 mm.

In principle, for creating the continuous belt using the seam 9 embedded according to the invention, it is sufficient for the above-described polymer layer 3 to be present merely in the seam region 6 to protect the thread 7. The type of polymer embedding or Polymer coating respectively or rubberizing respectively of the fabric layer 2 next to the seam region 6 can be adapted individually to the respective application. Thus, the belt 1 may be provided with the same polymer layer 3 across its entire circumference, or the polymer layer 3 next to the seam region 6 may have another composition and/or thickness. Under certain circumstances the upper material or the polymer layer 3 respectively next to the seam region 6 can be omitted altogether so that the fabric layer 2 lies bare.

Embedding the thread 7 into the polymer layer 3 in the seam area 6 can be attained, for example, by exerting a certain thread tension upon forming the seam 9 in a sewing process so that the thread 7 is pushed in the transition regions 20 between the stitches 8 into the polymer material of the polymer layer 3 (see FIG. 2a) and this is deformed thereby in such a manner that a recess 21 having the depth of penetration T is formed. This can even be augmented in operation of the belt 1 when a tensile force acts on the belt 1 which also increases the thread tension of the thread 7. This will draw the thread 7 even deeper into the polymer material while deforming the polymer layer 3; thus, the depth of penetration T is increased.

Thereby the thread 7 will approach the fabric layer 2 closer and closer without actually touching it, however, thereby protecting the thread 7 even better. Because the elastic polymer material is still present between the fabric layer 2 and the thread 7 it is also possible to attain a certain shock elasticity in operation of the belt 1 because the thread 7, in the event of abrupt tensile on the belt 1, is pressed into the elastic resilient polymer material. This dampens the jerk on the thread 7 protecting it from being torn.

In order to simplify into the polymer layer 3 even further, it may be provided for the surfaces 10a, 10b of the polymer layer 3 to have, at least in the seam region 6, a structure or a certain roughness and, thus, already small unevenness. Herby, it is sufficient to provide a structure of the polymer layer 3 merely in the seam region 6. Thus, the thread 7 may immerse in the polymer layer 3 with an even smaller force or a smaller thread tension because the recess 21 will then be formed in part already by the existing unevenness. In addition, in operation of the belt 1 the thread 7 will be later pulled less strongly, given identical tension on the belt 1, into the polymer layer 3 than in the case of unstructured surfaces 10a, 10b. This can avoid subsequent loosening of the thread 7. In principle, it may also be provided to form the recess 21 in advance already by introducing a corresponding profile into the surfaces 10a, 10b along which the seam 9 will then be formed.

In the alternative, it may be provided to finally embed the thread 7 into the polymer layer 3 only after sewing. To that end, for example, it may be provided for the respectively outward facing cover layer 3b of the polymer layer 3 of a provided belt 1 to be ablated, at least in the respective end region 1a, 1b or in the seam region 6, prior to sewing and after sewing of the end regions 1a, 1b for a non-cross-linked polymer layer to be applied, at least in the seam region 6, again as outside-facing outer cover layer 3b so that it completely covers the seam. This non-cross-linked polymer layer is cross-linked or vulcanized after sewing so it becomes part of the belt 1 thereby partially embedding the fabric layer 2 so that the thread 7 therein is also embedded. Thus, with this method, the thread 7 is embedded in the polymer layer 3 of the belt 1 only after sewing.

Thus, by virtue of the described methods of embedding the thread 7 into the polymer layer 3 it is possible to protect the thread 7. This prevents the thread 7 from wearing too quickly when the belt 1 is in continued operation or individual regions of the thread 7 tear as a result of the load, in particular friction, emanating from the rollers or the crop or the respective application specific component in contact and the continuous belt 1 becoming apart over time at the area of the belt connection as a result of the load.

Instead of using merely one embedded thread 7 it is possible to utilized two or more embedded threads 7 each forming a seam 9 according to the above description. According to top view in FIG. 3a, for example, the multiplicity of threads 9 may exhibit a zig-zag path 22a as seam shape and may even intersect, whereby the multiplicity of threads 9 are introduced into the seam region 6 in such a way across the width of the belt 1 and displaced in relation to one another in such a manner that a diamond pattern is created from two zig-zag paths 22a.

In order to guarantee, even with this belt connection, a high tensile strength of the belt 1 in operation, each seam 9 is made such that the thread 7 is provided, in the transition region 20 between the stitches 8, with a direction component x in or parallel to a longitudinal direction L of the continuous belt 1. This aligns the thread 7, at least in part, in the transition regions 20 in the main direction of load of the belt 1, preferably in a tensile load direction, so a major share of the tensile force in the area of the belt connection can be absorbed by the thread 7 embedded therein.

This can be guaranteed, for example, by the above-described zig-zag path 22a according to FIG. 3a, where the two threads 7 of the two seams 9 are angled in the respective transition regions 20 at an angle α of about +5° or 5° respectively in relation to the longitudinal direction L of the belt 1. Thus, the direction component x of the thread 7, running parallel to the longitudinal direction L of the belt 1, already makes up a larger share than the direction component y, running perpendicular to the longitudinal direction L of the belt 1.

Hereby, the angle α can be chosen, in principle, between 5° and 60°. Preferably, however, the direction component x of the thread 7 prevails than runs parallel to the longitudinal direction L of the belt 1, i.e. the angle α is preferably smaller than 45°. However, alternatively, a wave shaped path 22b (s. FIG. 3b) or a rectangular path 22c (s. FIG. 3c) may be utilized, by means of which a tensile load on the belt connection can also be effectively absorbed. The various seam paths 22a, 22b, 22c may also be combined with one another.

Thus, the collaboration of the embedding of the thread 7 into the polymer layer 3 and the proportionate orientation of the thread 7 or the seam 9 respectively in the longitudinal direction L make for a particularly high tensile strength of the belt 1, also in the area of the belt connection, that can be maintained over a long period of time. The selection of the fabric in the fabric layer 2 may also particularly contribute to that.

Figure 2B:
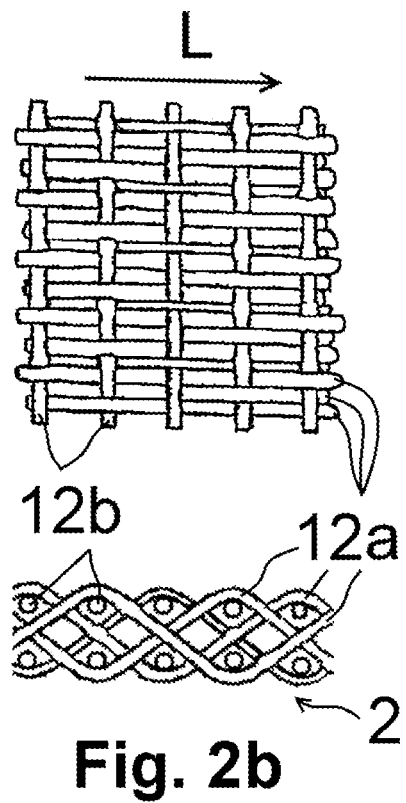

Hereby, preferably, the reinforcing fabric layer 2 is designed as a so-called fabric in SZ twist configuration made of twisted warp threads 12a and weft threads 12b (s. FIG. 2b), such an SZ fabric has been described, in exemplary fashion, in the document EP 0 213 219 A1 the contents of which are hereby incorporated by reference into the present application in their entirety. Such an SZ fabric is characterized in that adjacent warp threads 12a, each being twisted, extending preferably in the longitudinal direction L of the belt 1, exhibit different rotational directions of twisting. Hereby, essentially half of the number of warp threads 12a exhibit one rotational direction while the other, remaining warp threads 12a exhibit the opposite rotational direction. Thus, warp threads 12a are used which are twisted, upon being manufactured or twisted respectively, in differing directions, whereby, expediently, uniform rotation rates are applied for the threads. Preferably, oppositely twisted warp threads 12a may be combined in pairs and embraced in pairs by the weft threads 12b (not shown in FIG. 2b), thereby generating a particularly advantageous mutual balance effect of adjacent warp threads 12a so that are very high tensile strength of the belt 1 can be guaranteed already. Furthermore, the SZ fabric can also guarantee an improved directional stability of the belt 1.

Since the thread 7 penetrates this SZ fabric in several stitches 8 the tensile load on the thread 7 can also be efficiently transferred to the fabric layer 2 making it possible to maintain a high tensile strength of the belt 1 even across the belt connection. Hereby, however, it should be ensured that the fabric layer 2 is not perforated too much by the stitches 8, i.e. the spacing of stitches is not too small, preferably larger than 2 mm, and the stitch density is chosen to be not too high, because otherwise the overall tensile strength of the belt 1 is strongly reduced.

In addition, according to FIG. 2b, this SZ fabric may be designed in a double layer structure, whereby the weft threads 12b in this double layer structure is arranged in pairs one on top of the other (in the direction of penetration of the stitches 8) and die warp threads 12a are crossed with the weft threads 12b, as shown in FIG. 2b. Hereby it is possible to increase the density of the twisted threads and, thereby, the tensile strength of the belt 1 as such. In a combination of this double layer structure with the above-described SZ fabric each warp thread 12a shown is replaced by two warp threads 12a which are running in parallel and oppositely twisted.

By virtue of the design including pairs of overlying weft threads 12b (double layer) it is possible to attain, besides the high tensile strength, also a particularly high pull-out strength of the thread 7. This is because the thread 7 penetrates (stitch 8) the crossed warp threads 12a and weft threads 12b of a fabric layer 2 in the seam region 6 at various locations at crossing points 24 (see FIG. 2, 2c). Thus, the thread 7 is clamed in per fabric layer 2 on both sides in a certain area by the warp threads 12a and the weft threads 12b. This makes for the tensile loads acting on the thread 7 to be diverted even better into the fabric layer 2. Since, according to FIG. 2, 2c, the thread 7 penetrates two fabric layers 2 (of the two end regions 1a, 1b) in the overlap region 4, this effect is even enhanced so that the tensile strength of the entire belt 1 including across the belt connection can be further improved.

Depending on the design and application of the belt 1, a seam length N of the seam region 6 and/or an overlap length Ü of the overlap region 4 may be adapted. Hereby, it may also be provided for the seam region 6 to be larger than the overlap region 4 and/or to project beyond that at least on one side, as indicated in the FIGS. 3a, 3b and 3c. Thus, the seams 9 extend into a small region alongside the belt ends 11a, 11b of the belt 1. In this case, the belt ends 11a, 11b are pressed by the seam 9 towards the surfaces 10a, 10b of the polymer layer 3 so that, advantageously, any folding over of the end regions 1a, 1b starting at the belt ends 11a, 11b can be suppressed. This enables a continued steady running operation of the belt 1 and tearing of the belt connection by folding over of the end regions 1a, 1b can be avoided or delayed respectively.

In addition or alternatively, an assembly seam 25 may be provided running perpendicular to the longitudinal direction L, as shown in FIG. 3a, 3b, 3c, and serving to press on the belt ends 11a, 1b. Hereby, the angle of the assembly seam 25 in relation to the longitudinal direction L is preferably between 45° and 90°, preferably 60°. More than one such assembly seam 25 may be provided.

According to the flow chart in FIG. 4, for creating the continuous belt 1 it may be provided to first provide, in a first step St1, a fabric layer 2 covered at least in the end regions 1a, 1b by a polymer layer 3 or rubber layer respectively. Hereby, the polymer layer 3 may be cross-linked already sein or cross-linked only later by means of thermal treatment. In the end regions 1a, 1b, the polymer layer 3 may be ablated at least on one side in certain areas in order to attain the graded contours shown in FIG. 2, 2c. In a second step St2, the end regions 1a, 1b are placed flat on to of one another in an overlap region 4. Optionally, in an intermediate step StZ, another structuring of the surfaces 10a, 10b of the polymer layer 3 may be carried out, at least in the later seam region 6, so as to facilitate the embedding of the thread 7 in the subsequent third step St3.

In the third step St3, the end regions 1a, 1b are sewn in the seam region 6 using the thread 7, thereby creating an embedded seam 9. Hereby, in this step, when the outward facing cover layer 3b of the polymer layer 3 has been ablated prior to sewing, a non-cross-linked polymer layer can be applied to the seam 9 as outward facing cover layer 3b so as to cover the seam 9 preferably completely and to protect the same. If the process of cross-linking the polymer layer 3 has not yet been carried out this will be done now in this sewn state, in a fourth step St4, by means of a suitable thermal treatment. Hereby, the embedded seam 9 can be protected even better. In the subsequent operation of the belt 1 the depth of penetration T of the thread 7 may change due to the tensile load applied.

LIST OF REFERENCE NUMERALS 1 belt
1a first end region
1b second end region
2 fabric layer
3 polymer layer
3a inward facing outer cover layer of the polymer layer 3
3b outward facing outer cover layer of the polymer layer 3
4 overlap region
5a, 5b step in the end regions 1a, 1b
6 seam region
7 thread
8 stitch
9 seam
10a, 10b surfaces of the polymer layer 3
11a, 11b belt ends
12a warp thread
12b weft thread
17 overhang
20 transition region
21 recess
22a zig-zag path of the seam 9
22b wave-shaped path of the seam 9
22c rectangular path of the seam 9
24 intersection point between stitch 8 and fabric layer 2
25 assembly seam
L longitudinal direction
x, y directional component
St1, St2, St3, St4, StZ steps of the method

The invention claimed is:

1. A belt configured as a continuous traction means for conveyor belts used in agricultural machines, the belt comprising:
   at least one fabric layer embedded in a polymer layer in certain regions of the belt;
   end regions lying flat on top of one another and forming an overlap region connected to each other by at least one thread forming a seam, creating a continuous belt, and reinforced by the at least one fabric layer; and
   wherein the at least one thread penetrates the end regions of the belt a in a seam region in several stitches, and the at least one fabric layer of the belt is embedded in the polymer layer across the seam region; and
   wherein the thread in transition regions between the stitches is embedded in the polymer layer close to a surface at a pre-determined depth of penetration such that the thread runs completely or at least mostly below the surface of the belt.

2. A belt according to claim 1, further comprising a surface structure at least in certain seam region and/or in the overlap region.

3. A belt according to claim 1, wherein the polymer layer extends across the entire belt including the seam region.

4. A belt according to claim 1, wherein at least a part of the polymer layer is arranged between the fabric layer and the transition regions of the thread.

5. A belt according to claim 1, wherein a seam formed in the seam region by the at least one thread exhibits a zigzag path and/or a wave-shaped path and/or rectangular path.

6. A belt according to claim 5, wherein, at least one seam assembly is provided that runs in the seam region perpendicular to a longitudinal direction of the belt.

7. A belt according to claim 1, wherein the seam region goes beyond the overlap region at least on one side such that stitches and transition regions located outside the overlap region for pressing end regions of the belt to the surface of the belt.

8. A belt according to claim 1, wherein at least one fabric layer further comprises a double fabric structure having at least one fabric layer designed as a fabric in SZ twist configuration, and wherein the at least one fabric later is penetrated by the threat at certain intersection points.

9. A belt according to claim 1, wherein a substance-to-substance bond is formed between the end regions of the belt and/or an additional non-cross-linked or cross-linked polymer layer is arranged between the end regions of the belt.

10. A belt according to claim 9,
   wherein the end regions of the belt are graded in an opposite manner to minimize any overhang between the end regions; and
   wherein the respective end region further comprises of an inside facing outer covering layer of the polymer layer removed at least in part thereby creating one step each, and the oppositely graded end regions lie flat upon one another in the overlap region to create the continuous belt.

* * * * *